J. M. DALY.
LOAD BRACE FOR CARS.
APPLICATION FILED MAR. 5, 1909.

994,822.

Patented June 13, 1911.

3 SHEETS—SHEET 1.

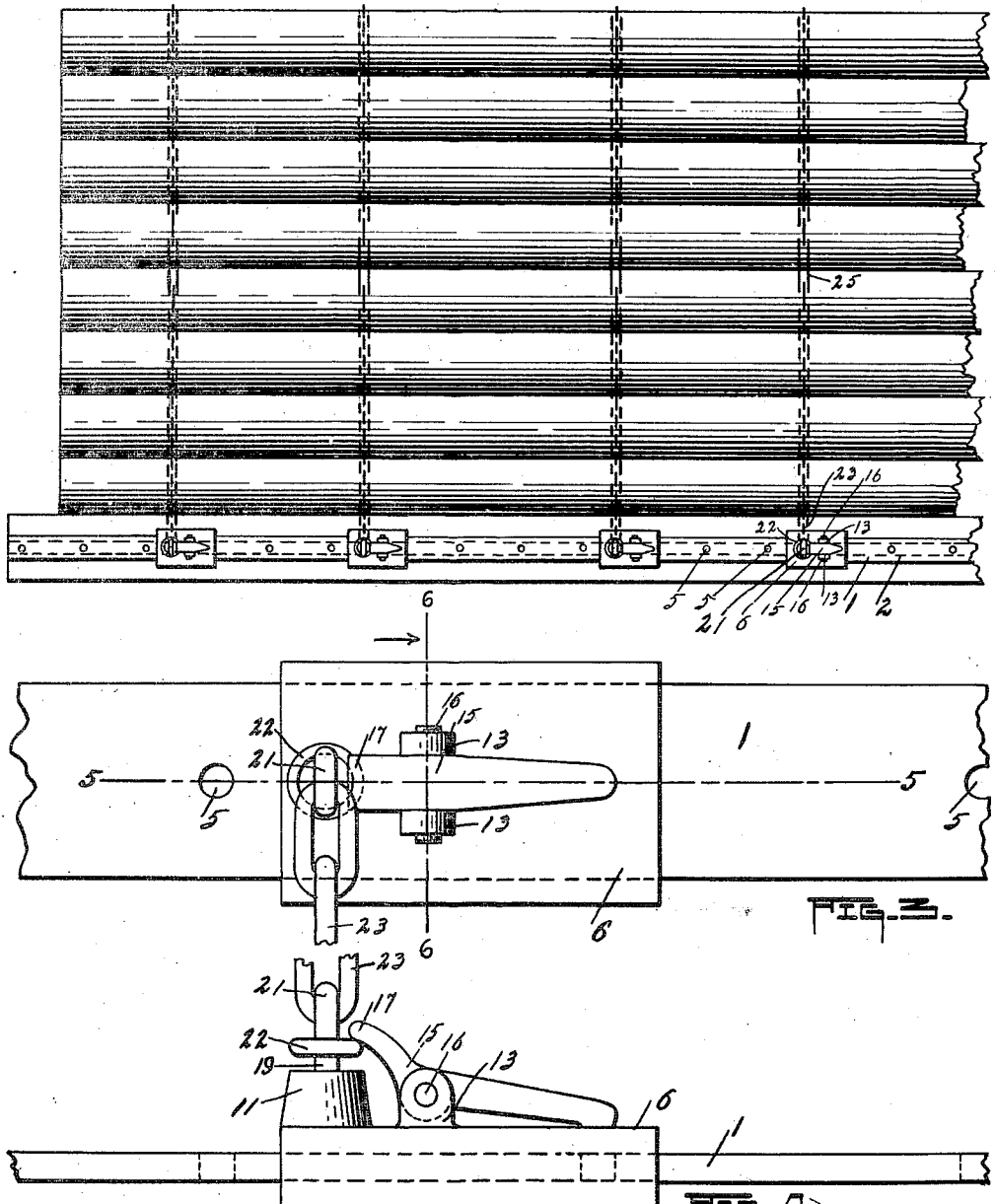

J. M. DALY.
LOAD BRACE FOR CARS.
APPLICATION FILED MAR. 5, 1909.
994,822.
Patented June 13, 1911.
3 SHEETS—SHEET 3.
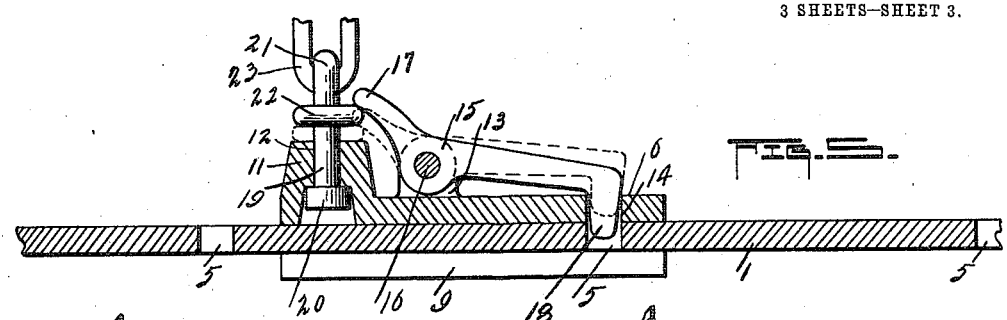
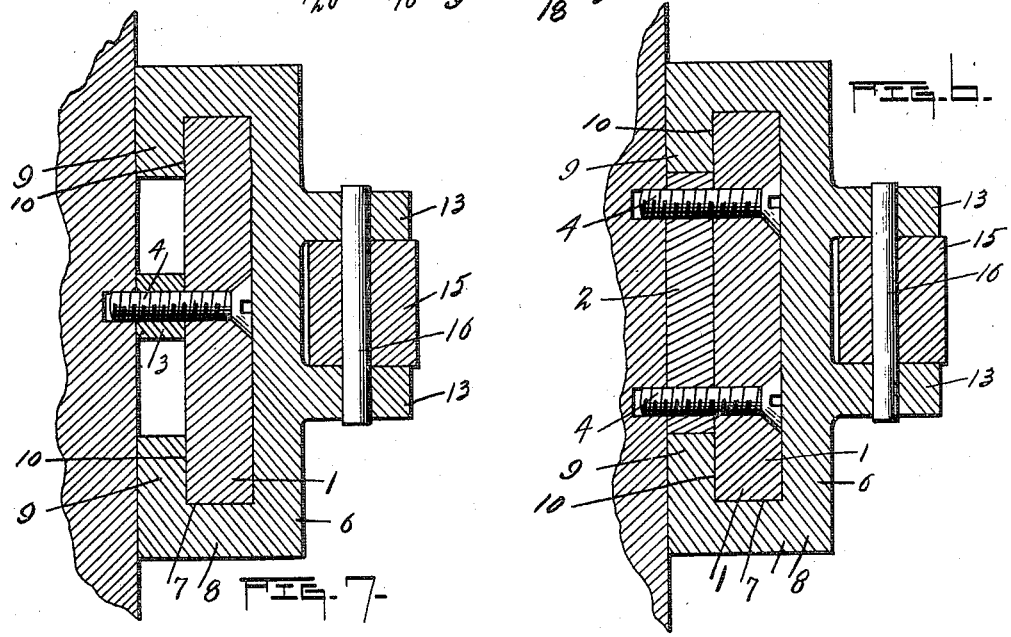
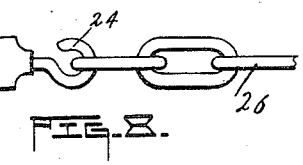
Witnesses:
H. V. Gibson
Chrish Daly
Inventor.
John M. Daly
By Chas. H. LaPonte
Atty.

UNITED STATES PATENT OFFICE.

JOHN M. DALY, OF CHICAGO, ILLINOIS.

LOAD-BRACE FOR CARS.

994,822. Specification of Letters Patent. Patented June 13, 1911.

Application filed March 5, 1909. Serial No. 481,510.

*To all whom it may concern:*

Be it known that I, JOHN M. DALY, a citizen of the United States, residing at Chicago, in the county of Cook and State of Illinois, have invented certain new and useful Improvements in Load-Braces for Cars; and I do hereby declare that the following is a full, clear, and exact description of the invention, which will enable others skilled in the art to which it appertains to make and use the same.

This invention has reference to a car-loading-brace or apparatus, which has for its principal object to secure loading in or upon cars and other wheeled vehicles, so as to prevent shifting and breaking of the load in the car, by falling down or by knocking together as car is moved.

Merchandise, furniture, stoves, flour, sugar, butter and eggs and other traffic shipped in packages are very frequently broken and damaged by reason of shifting, falling down and by knocking against each other while in transit, due to failure to securely brace the shipment when loaded. For such damage to the freight, railroads are constantly called upon to pay out large sums of money, and it is to overcome this constant expense which the railroads are called upon to pay for damage to freight and to protect shipments, that I have devised the hereinafter described apparatus, which, while it serves as a brace for the freight in the car, also serves as a supplemental brace to the frame of a car.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1:
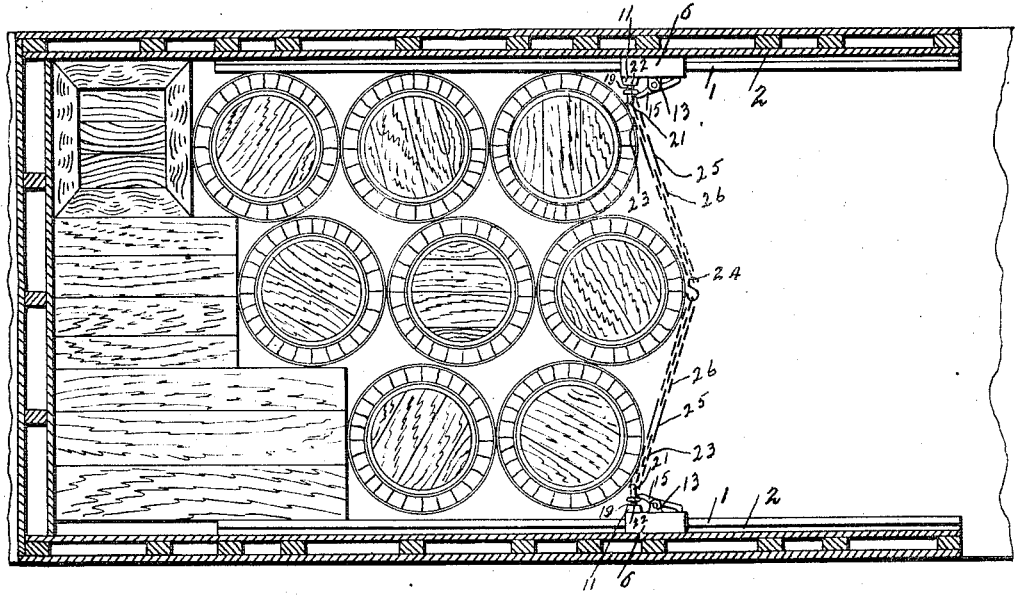
Figure 2:
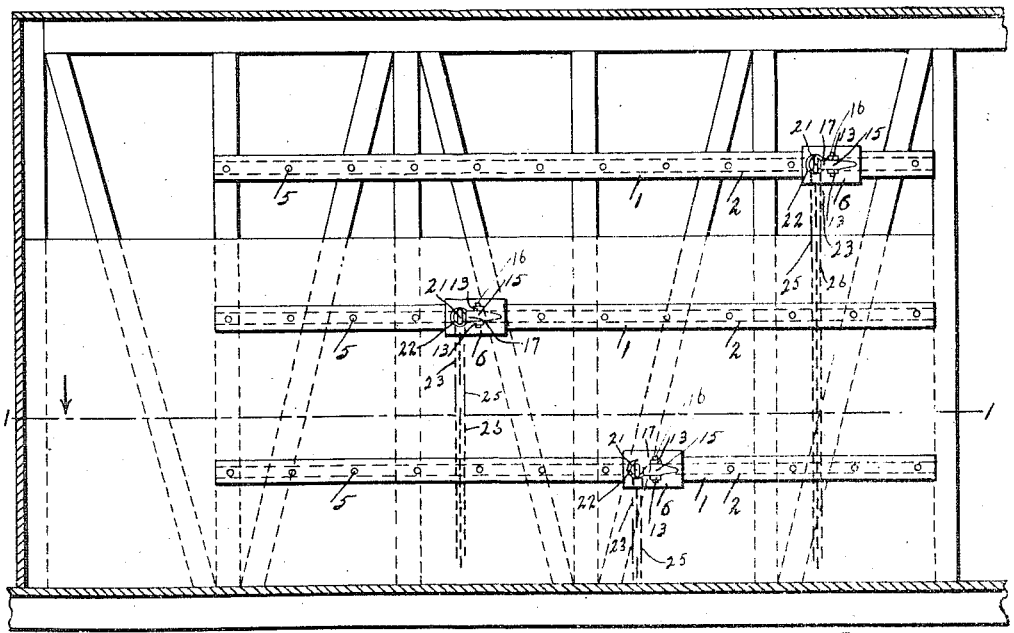

Figure 1 is a greatly reduced longitudinal sectional view in plan of a portion of an ordinary box-car, as the same would appear if taken on the line 1—1 of Fig. 2, with my improved loading brace applied thereto; Fig. 2 is a greatly reduced longitudinal sectional view in elevation of an ordinary box-car, showing my improved loading brace attached to the side of the car; Fig. 3 is an enlarged side elevation of a portion of one of the brace bars and a sliding block thereon; Fig. 4 is an edge view of Fig. 3; Fig. 5 is a longitudinal sectional view as the same would appear if taken on the line 5—5 of Fig. 3; Fig. 6 is an enlarged cross-section as the same would appear if taken on the line 6—6 of Fig. 3; Fig. 7 is a view similar to Fig. 6, except that a modified means is shown for spacing the brace-bars from the sides or side-brace of the car body; Fig. 8 shows a detail of one of the load-bracing-chains, and Fig. 9 shows the application of the invention to coal or flat cars for bracing lumber, logs and the like, loaded upon such cars.

Like numerals of reference indicate corresponding parts throughout the figures.

While I have shown the invention applied or attached to an ordinary box-car of wood, having the usual grain lining and also applied or attached to an ordinary flat car of wood, it is understood that with slight modifications in the mode of attaching or connecting the brace to a car, the brace may be applied or attached to steel cars of every description.

It has been the custom among the railroads when shipping sugar, molasses, flour in barrels and various other merchandise, to brace the load by means of wood braces nailed to the sides of the cars, but this tends to ruin the lining and braces for the cars, is expensive and does not altogether prevent load from shifting. It has been proposed to provide a portable brace for the load in cars which is made of iron bars, gas pipe, etc., which are placed against both sides of the car in front of load and said braces are provided with means for engaging the sides of the car for securely fastening the same in position. A brace of this character is only suitable for wood cars and cannot be used in steel cars for the reason that there is no wood into which the securing means of the brace may take hold. There is the further objection to this character of brace and that is, it being portable, must be numbered and way-billed each time it is used and if it goes to another road is done for and lost. I obviate all of these disadvantages, by producing a brace intended to be secured to and kept with a car and may be attached to any of the different types of cars, whether wood or steel.

1 designates a brace bar, preferably extending longitudinally of and attached or secured to the sides of a car and is spaced from the side of the car, for reasons which I will more fully explain, either by attaching the brace-bar to the strip 2, which may be of any suitable material, which is of equal length with the brace-bar, but not so deep as said brace-bar, and brace and strip are together secured to the side of a car, see Figs. 2 and 6, or the brace may be secured to the side of a car and spaced therefrom by means of the interposed washers or collars 3 through which the securing means for the brace-bar may pass, see Fig. 7. I prefer to employ screws 4 for attaching the brace-bar to the sides of the car as they will leave the outside face of the bar 1 smooth and unobstructed, as shown. The brace-bar 1 is provided with a plurality of openings 5 throughout the length of the bar and spaced apart any distance desirable.

6 denotes a slidable block or frame, preferably formed with a channel 7 formed by the over and underlying portions 8 of the frame or block which fit over and under the upper and lower edges of the brace-bar 1 and the rear depending and inwardly extending portions 9 which overlap and engage the rear face of said bar 1. When attaching the bar 1 to the side of a car with the strip 2 interposed therebetween, channels or groove 10 are formed above and below the strip 2 and between the upper and lower portions of the bar 1 and side of car and in these channels the portions 9 are carried and travel when the block or frame 6 is moved along the bar 1. With such a construction, it will be seen that the block or frame 6 is firmly secured to the bar 1 against movement in one direction, and that is movement laterally of the bar 1. There is an objection to the use of the strip 2, hence the washers or collars 3 may be submitted. The objection to the use of the strip 2 is, when placed in a grain-car, the grain will find a lodging place in the upper groove or channel 10 and upon the upper edge of strip 2, but with the use of the washers or collars 3, there will be no place for the grain to lodge, and falling behind the bar 1 will drop to the floor and may be swept out.

The block or frame 6 is provided with the tubular boss 11 opening out of the rear face of the block and which has the reduced opening 12, opening out of the front of said boss. The block is further provided with spaced ears 13 and an opening 14, at a suitable point which may be brought to coincide with any of the openings 5 in the bar 1. Between the ears 13 of the block or frame 6, is pivotally carried a lever 15, which is fulcrumed at the stem 16, journaled in said ears. This lever has the rearwardly and upwardly carried extension 17 and at its forward end is provided with a finger 18 which is normally carried in the opening 14 in the block or frame 6, and is so arranged that it may enter any one of the openings 5 in the bar 1, when such openings coincide with the opening 14 in the block. Carried in and projecting without the boss 11 through the opening 12 therein, is a stem 19, having attached thereto a shoulder 20 which will prevent the stem 19 being drawn through the boss, and on the outer end of said stem, is provided an eye 21 and at the base of the eye, a ring like shoulder portion 22. To the eye 21 is connected a link of a chain 23 which may be of any length desired, preferably only sufficient to extend approximately one half way across a car, in which the same is arranged, and at the free end of the chain the same is provided with a hook 24 capable of having engagement with a chain similar to the chain 23 connected to and extending from a similar attachment, such as the block 6 containing the stem 19 and the eye 21, on the opposite side of the car. In the length of the chain 23 is provided a turn buckle 25 for purposes which will be further explained. The chain to which the chain 23 is connected, for convenience is designated as 26, and it has also in its length, a turn buckle 25 similar to the turn buckle in the chain 23.

From the foregoing, it will be understood that the block or frame 6 has a slidable relation with the bar 1, and that when the finger 18 of the lever, is withdrawn from the opening 5 in the bar 1, that said block or frame 6 may be moved from end to end of the bar 1, and that any point on said bar when the opening 14 in the block 6 coincides with an opening 5 in the bar 1, the lever may be operated to cause the finger 18 thereof to enter the coinciding opening 5 in the bar and lock said block or frame 6 against endwise movement. When in operation, that is, when the chains are being employed to brace a load in a car, and the chains are drawn taut across the car, the stem 19 to which the chains are connected, will be drawn outwardly as far as it is possible to draw the same, which, however, is sufficient to cause the shoulder portion 22 on the stem 19 to engage the extension 17 of the lever and securely hold the finger 18 of the lever projected into one of the openings 5 in the bar 1, preventing the lever from becoming disengaged from the bar, and thereby preventing the block from moving lengthwise of the bar 1, which might occur, if some such means as I have shown were not employed for locking the lever from disengagement with the bar, during the pressure of the shipment against the chains, in the body of the car. Just as soon as the chains 23 and 26 are disconnected, the stem 19 may be projected inwardly in the boss 11, which will release the engaging portion 22 of the stem from the lever, so that the lever may be released from engagement with the bar 1.

It is intended that the bars 1 may be provided in series and superimposed one above the other, as shown in Fig. 2, of the drawings, where three bars are provided extending longitudinally for a portion of the length of the car, two of which are attached to the grain lining in the car, and the top one shown supported from the braces for the side of the car. There will be a corresponding number of bars 1 upon the opposite side of the car, and in the same horizontal plane with the corresponding bars which are shown in Fig. 2. On each of these bars may be slidably arranged one or more of the blocks or frames 6, although in the present instance, the respective bars are only shown with one block or frame 6 thereon. To the blocks or frames 6 which are carried on one side of the car, will be connected chains 23 which have the hooks 24, and to the blocks or frames 6 carried upon the opposite side of the car, will be connected chains 26 having a suitable link with which the hooks 24 of the opposite chains may be connected, or if desired, both the chains 23 and 26 may have hooks 24 and arrangement made for connecting said hooks with the links of the opposite chains. In Fig. 1, the application of the loading brace and the elements constituting such brace, are very plainly seen, and the manner in which the same are used for holding a load against shifting in the car. I employ chains to hold the brace because the same are flexible and may be easily handled and provide in such chains the turn buckles 25 for the purpose of taking up the slack in the chains when they are connected, as it would hardly do to have the chains loose, for this would permit the load to shift about the car, which is the one thing which I intend to obviate by the application of my invention.

While the load brace which I show, is applicable for use and intended to be employed in box cars of different types, yet the invention may be applied equally as well to coal or flat cars for securely holding a load, such as coal, logs or lumber from shifting about on the car and from falling therefrom. In Fig. 9, the floor of a flat car is shown and attached to and extending longitudinally of the sides thereof, are bars 1, on which are slidably mounted the blocks or frames 6, and adapted to have the same connection with said bars 1 as the blocks or frames 6 in the manner shown in Fig. 5. In this instance the chains 23 and 26 will be carried up and across the load and connected, in the manner previously described, for securely retaining the load on the car.

It will be observed that I place the boss 11 on the end of the block or frame 6 nearest the end of the car, and my object in so doing is to relieve the strain on the pin 16 of the lever, when said pin has a locking relation with the bar 1 and the load is exerting a pressure against the brace chains 23 and 26. The load pressing against the chains will cause the stems 19 to be drawn outwardly, bringing the shoulder 20 of the stem 19 firmly up against the shoulder formed in the boss 11; this will have a tendency to throw the opposite end of the block or frame 6 in against the bar 1, and in so doing, cause the block to bind against the bar, assisting in holding the block against longitudinal movement, and will relieve the strain on the finger 18 of the lever.

It will be understood that I place no limitation on the number or the length of the bars 1 or the relation which they shall have when secured to a car or the manner in which the same may be secured, so long as one or more longitudinal supports are provided on which are slidably mounted devices which may be locked at different positions, and to which said devices are connected, means which may be carried transversely across the car body for bracing a load in or upon the car.

Having thus fully described my invention, what I claim and desire to secure by Letters Patent of the United States, is:—

1. A load-brace for cars, comprising sustaining means adapted to have connection with the opposite sides of a car, and flexible brace members connected with said sustaining means and arranged to have connection with each other approximately centrally of the body of the car.

2. A load-brace for cars, comprising sustaining means adapted to have connection with the opposite sides of a car, and chains connected with said sustaining means and arranged to be connected transversely of the car body.

3. A load-brace for cars, comprising longitudinally movable members arranged to be supported on the opposite sides of a car body, chains connected with said members and movable therewith, and said chains arranged to be connected with each other transversely of a car body.

4. A load-brace for cars, comprising longitudinally movable members arranged to be supported on the opposite sides of a car body, means for fixing said members in adjusted positions, and chains connected with said members, and said chains arranged to be connected with each other transversely of a car body.

5. A load-brace for cars, comprising brace bars adapted to be carried longitudinally of and secured to the sides of a car body, sustaining means carried by said bars, and flexible brace members connected with said sustaining means and arranged to be connected with each other transversely of a car body.

6. A load-brace for cars, comprising brace bars adapted to be carried longitudinally of and secured to the sides of a car body, blocks slidably supported on said brace bars, means for fixing the blocks in adjusted positions on the brace bars, and chains connected with said blocks, said chains also arranged to be connected with each other.

7. A load-brace for cars, comprising a plurality of superimposed brace bars adapted to be carried longitudinally of and secured to the sides of a car body, sustaining means carried by each of said bars, and flexible brace members connected with the sustaining means of each of the bars, the brace members connected with the sustaining means in opposed relation to each other adapted to be connected together transversely of the car body.

8. A load-brace for cars, comprising a plurality of superimposed braces adapted to be carried longitudinally of and secured to the sides of a car body, a block slidably supported upon each of said brace bars, means for locking the blocks in adjusted positions on said bars and brace members connected with said blocks, said brace members arranged to be carried transversely of the car body and connected with brace members of opposing blocks.

9. A load-brace for cars, comprising a pair of brace bars adapted to be attached to the opposite sides of a car body and spaced from the sides thereof, a member slidably supported on each bar, means on each member for locking that member to its bar, a chain connected to each member, and means for connecting said chains transversely of the car body.

10. A load-brace for cars, comprising a pair of brace bars adapted to be attached to the opposite sides of a car body and provided with a plurality of openings therein, a member slidably supported on each bar, a lever pivotally connected with each member and arranged to enter the openings in the bar for locking the members in adjusted positions on said bars, a chain connected to each member, and means for connecting said chains transversely of the car body.

11. A load-brace for cars, comprising a pair of brace bars adapted to be attached to the opposite sides of a car body and provided with a plurality of openings therein, a member slidably supported on each bar, a lever pivotally connected with each member and arranged to enter the openings in the bar for locking the members in adjusted positions on said bars, brace chains arranged to be connected transversely of the car body, connections for the chains with the members, said connections for the chains arranged to push against the levers when the chains are connected for firmly holding the levers inserted into the openings in the brace bars.

12. In a brace of the character described, the combination of a brace bar adapted to be supported longitudinally of a car body, a longitudinally movable member carried by said bar, means on the member for locking the same in adjusted positions on the bar, and means on said member to which may be connected a chain.

13. In a brace of the character described, the combination of a brace bar adapted to be supported longitudinally of a car body and provided with a plurality of openings, spacing means for said bar from the side of the car body, a longitudinally movable member carried by said bar having an opening arranged to be brought coincident with the openings in the bar, a lever pivotally mounted on the member having a finger operating through the opening in the member and arranged to enter any one of the openings in the bar for locking said member to the bar, a brace sustaining member movably supported on the member and having an engaging portion arranged to engage the lever for firmly holding the finger of the lever in any one of the openings in the bar.

14. A load-brace for cars, comprising a pair of brace bars adapted to be carried longitudinally of and secured to the sides of a car body, a member for each bar slidably mounted thereon, means for locking the members in adjusted positions on their respective bars, chains connected with said members and arranged to be connected with each other transversely of the car body and a turn buckle in each of said chains.

15. A load-brace for cars, comprising brace bars adapted to be secured to the sides of a car body, sustaining members movably secured on said brace bars, flexible braces connected with the sustaining members and arranged to be connected with each other, and means connected with said flexible braces for taking up the slack therein when they are connected.

16. A load brace for cars, comprising brace bars arranged longitudinally of a car body, members slidably carried on said brace bars, means for fixing the members in adjusted positions on the brace bars, and bracing means attached to each member and adapted to be connected with each other.

17. A load brace for cars, comprising a plurality of superimposed brace bars arranged longitudinally of a car body, members carried on each bar, bracing means connected with the members of each of the bars, said bracing means connected with the said members in opposed relation to each other adapted to be connected together transversely of the car body.

In testimony whereof I affix my signature, in presence of two witnesses.

JOHN M. DALY.

Witnesses:
CHARLES B. WINTERSMITH,
EDWARD J. REILLY.